US 12,055,192 B2

(12) United States Patent
Kern et al.

(10) Patent No.: US 12,055,192 B2
(45) Date of Patent: Aug. 6, 2024

(54) SPRING ELEMENT AND FIRE-RESISTANT COVER LAYER

(71) Applicant: GMT GUMMI-METALL-TECHNIK GMBH, Bühl (DE)

(72) Inventors: Jakob Kern, Karlsruhe (DE); Marcus Pickard, Bühl (DE); Martin Meier, Ottersweier (DE); Erick Lüerssen, Karlsruhe (DE)

(73) Assignee: GMT GUMMI-METALL-TECHNIK GMBH, Bühl (DE)

( * ) Notice: Subject to any disclaimer, the term of this patent is extended or adjusted under 35 U.S.C. 154(b) by 119 days.

(21) Appl. No.: 17/441,730

(22) PCT Filed: Mar. 13, 2020

(86) PCT No.: PCT/EP2020/056993
§ 371 (c)(1),
(2) Date: Sep. 22, 2021

(87) PCT Pub. No.: WO2020/193241
PCT Pub. Date: Oct. 1, 2020

(65) Prior Publication Data
US 2022/0186805 A1    Jun. 16, 2022

(30) Foreign Application Priority Data
Mar. 22, 2019  (EP) ..................................... 19164577

(51) Int. Cl.
*F16F 1/371* (2006.01)
*F16F 1/40* (2006.01)

(52) U.S. Cl.
CPC ................ *F16F 1/371* (2013.01); *F16F 1/40* (2013.01); *F16F 2230/0023* (2013.01)

(58) Field of Classification Search
CPC .. F16F 1/371; F16F 1/387; F16F 1/393; F16F 1/40; F16F 2230/0023
See application file for complete search history.

(56) References Cited

U.S. PATENT DOCUMENTS

| 4,736,932 A | 4/1988 | Haslim |
| 2017/0267260 A1 | 9/2017 | Fromont et al. |

FOREIGN PATENT DOCUMENTS

| CN | 204327824 | 5/2015 |
| DE | 102013017571 | 4/2015 |

(Continued)

OTHER PUBLICATIONS

Russian Office Action and Search Report dated Aug. 4, 2023 from corresponding Russian Application No. 2021127302/11(057604).

(Continued)

*Primary Examiner* — Melanie Torres Williams
(74) *Attorney, Agent, or Firm* — Grogan, Tuccillo & Vanderleeden LLP

(57) ABSTRACT

The invention relates to a spring element for vibration damping and/or suspension of a rail vehicle, comprising at least one elastic damping body and at least one fire-resistant cover layer arranged on the damping body, the cover layer having at least one compensation zone, wherein the compensation zone is compressed in the loaded state of the spring element such that wrinkling of the cover layer is prevented, wherein the cover layer and the damping body are inseparably connected to form a composite element. The invention further relates to a cover layer and the use of a spring element or a cover layer.

19 Claims, 2 Drawing Sheets

(56) References Cited

FOREIGN PATENT DOCUMENTS

| DE | 202017006889 | | 9/2018 | | |
|----|----|----|----|----|----|
| ES | 2507466 A1 | * | 10/2014 | ............... | B27N 9/00 |
| JP | H0429638 | | 1/1992 | | |
| JP | 2016173121 A | * | 9/2016 | ............ | B60G 11/22 |
| RU | 101514 | | 1/2011 | | |
| WO | 2018046150 | | 3/2018 | | |

OTHER PUBLICATIONS

Indian First Examination Report dated Oct. 7, 2023 from corresponding Indian Application No. 202117042551.
International Search Report from corresponding PCT Application No. PCT/EP2020/056993 dated Jul. 2, 2020.

* cited by examiner

SPRING ELEMENT AND FIRE-RESISTANT COVER LAYER

CROSS REFERENCE TO RELATED APPLICATIONS

This application is a national stage of International Application No. PCT/EP2020/056993, filed on Mar. 13, 2020, which claims priority to EP Patent Application No. 19164577.9 filed Mar. 22, 2019, all of which is hereby incorporated by reference in its entirety.

BACKGROUND

The invention relates to a spring element for vibration-damping and/or springing, with at least one elastic damping body and one fire-retardant overlayer arranged on the damping body.

The invention further relates to a fire-retardant overlayer for a spring element.

Spring elements used specifically in the rail vehicle sector are subject to particularly stringent requirements relating to behavior in the event of a fire. These must by way of example comply with specific fire-protection requirements in accordance with DIN EN 45545-2. However, because the mechanical requirements placed upon the spring elements are particularly stringent in the chassis sector, it is generally necessary to utilize damping bodies which have particularly good properties for absorption, and thus damping, of impacts and/or vibrations. Damping bodies of this type, designed with elastic properties, can therefore by way of example be produced from rubber mixtures which have a relatively high proportion of combustible substances, for example natural rubber. However, a spring element with a damping body having a high proportion of natural rubber would fail to comply with DIN EN 45545-2 because of poor behavior of said material in the event of a fire.

There are already known damping bodies produced from alternative rubber mixtures having low combustibility. These can by way of example comprise fire-retardant additives which improve the behavior of the damping body in the event of a fire. These spring elements often exhibit the disadvantage that their mechanical properties of the damping body are impaired. An example of a consequence of the above is that, because of excessive wear due to the impaired mechanical properties, it is no longer possible to achieve a required usage lifetime of the spring elements, which therefore require earlier replacement.

There have already been attempts to use a fire-retardant overlayer to protect a damping body from fire. However, the overlayers used for that purpose themselves likewise have relatively poor mechanical properties, a result of which can be that a fire-retardant overlayer likewise wears relatively quickly, thus making it impossible here again to achieve a required usage lifetime of the spring element. This can by way of example be attributable to the fact that the overlayer is less elastic than the damping body that it covers, and therefore folding occurs in the overlayer during compression of the damping body. During prolonged use this can result in cracks and other adverse effects on the overlayer, and there is therefore the risk of inability to comply with a required fire-protection behavior of the spring element.

A problem therefore exists in provision of a spring element and/or of a fire-retardant overlayer where the usage properties of the spring element and/or of the fire-retardant overlayer are improved in comparison with previously known spring elements and/or fire-retardant overlayers.

The solution of this problem is provided in the invention via a spring element with the features as claimed in claim 1. In particular proposed for the solution of the abovementioned problem is a spring element of the type mentioned in the introduction where the overlayer has at least one compensation zone which, in the stressed condition of the spring element, is compressed in a manner such that folding of the overlayer is prevented. In particular, folding can be prevented in a maximal stressing condition of the spring element. This has the advantage that damping bodies of previously known type, which by way of example can have been produced from rubber mixtures based on natural rubber, and which thus have good mechanical properties, can be used in spring elements which nevertheless comply with DIN EN 45545-2 by virtue of the fire-retardant overlayer. At the same time, the overlayer also complies with the mechanical requirements which arise specifically in the construction of rail vehicles because of the high loads acting on the springing components and/or vibration-damping components. By virtue of the at least one compensation zone, the surface profile of the spring element has a specific geometry which prevents folding of the overlayer in the stressed condition of the spring element. The compensation zone therefore reacts in the manner of a buffer zone where, when compression of the damping body occurs, the overlayer can be united without folding, thus enabling avoidance of excessive mechanical loading of the overlayer, which can lead to excessively rapid wear of the overlayer, or to adverse effects thereon.

BRIEF DESCRIPTION

Advantageous embodiments of the invention are described below which, with the features as claimed in claim 1, can optionally, alone or in combination, be combined together with the features of other embodiments.

In a particularly advantageous further embodiment, the compensation zone can be configured via an interruption of the overlayer. The overlayer can preferably have at least two overlayer regions, the arrangement of which is, in the unstressed condition of the spring element, separate at a distance from one another by virtue of an unoccupied space. In the stressed condition it is thus possible, by virtue of the unoccupied space between the overlayer regions, to unite said overlayer regions in a manner that prevents folding. When load is applied to the spring element, the fire-retardant overlayer becomes continuous, and thus the fire-retardant effect of the overlayer is retained. Alternatively, or in addition, it is possible that the overlayer is configured to be thinner in the compensation zone than an average layer thickness of the other regions of the overlayer. In this embodiment, the effect is fundamentally based on the same principle as in the embodiment described above. In particular, the overlayer can have a number of compensation zones.

In order to permit achievement of particularly good mechanical strength of the spring element, the overlayer and the damping body are inseparably crosslinked to give a composite element. In particular when the spring element is subjected to high loads, said measure can increase effectiveness in preventing separation of the overlayer from the damping body with resultant loss of the fire-protection effect of the overlayer. The crosslinking of the overlayer and the damping body can be achieved by way of example by vulcanization known per se. The crosslinking can preferably achieve the formation of covalent bonds between the overlayer and the damping body. For the purposes of the invention, the term "inseparably crosslinked" can refer to impossibility of nondestructive separation of the two parts from one another.

In another advantageous embodiment of the spring element, the damping body can have been produced from a rubber material, where the elasticity of the rubber material of the damping body can be higher than the elasticity of the overlayer. It is thus possible to use known damping bodies produced from rubber mixtures which per se are combustible and which in the absence of the overlayer could not comply with required behavior in the event of a fire.

In a particularly advantageous embodiment, the at least one overlayer can have been produced to some extent or predominantly from an elastomer. In particular, the at least one overlayer can have been produced at least to some extent from chloroprene rubber. It has been found that in particular chloroprene rubber has particularly good fire-protection properties. However, chloroprene rubber is in principle not a suitable material for use for an overlayer, because its mechanical properties in relation to strength and extensibility are inadequate to withstand the high loads that are in particular encountered in rail vehicles. Cracks can therefore occur in the overlayer at the surface of a damping body coated with an overlayer based on chloroprene rubber. However, by virtue of the at least one compensation zone configured in the overlayer it is possible to avoid such cracking. Surprisingly, it was in fact possible to establish that a spring element thus embodied has particularly good mechanical properties and moreover good fire-protection behavior.

In order to permit better avoidance of undesired formation of acid and/or formation of toxic smoke in the event of a fire, the overlayer can comprise at least flame retardant and/or acid-scavenger. For example, the at least flame retardant and/or acid-scavenger can be a, or a combination of two or more than two, flame retardant(s) and/or acid-scavenger(s) selected from the group of phosphorus-containing compounds, in particular ammonium polyphosphate (APP), nitrogen-containing compounds, in particular melamine, polyol compounds, in particular pentaerythritol, phosphate-containing plasticizers, in particular Disflamoll DPO, inorganic flame retardants and/or inorganic acid-scavengers from the group of the borates, in particular zinc borate, the group of the hydroxides, in particular aluminum trihydroxide and/or magnesium hydroxide and/or boehmite, the group of the antimony compounds, in particular antimony trioxide and/or antimony pentoxide, the group of the oxides, in particular magnesium oxide, the group of the nanoclays, graphite, in particular expandable graphite.

In order to permit achievement of good mechanical properties of a spring element together with long lifetime of the spring element, the overlayer, in particular outside of the compensation zone, can have an average layer thickness of 1 millimeter to 5 millimeters. In particular it can that the overlayer is configured to be maximally 4 millimeters thick, in particular in that the overlayer is configured to be maximally 3 millimeters thick, in particular in that the overlayer is configured to be maximally 2 millimeters thick, in particular in that the overlayer is configured to be maximally 1 millimeter thick.

In another advantageous embodiment it is possible that the overlayer forms, in particular, in the installed condition of the spring element, an external layer of the spring element.

In an advantageous further embodiment of the spring element, the design of the at least one compensation zone can be such that in the stressed condition, in particular in the maximally stressed condition, it has been to some extent or completely closed and/or pinched, so that an externally continuous overlayer is present.

In a particularly advantageous further embodiment, the spring element can be a spring element for vibration-damping and/or springing of rail vehicles. By way of example, the spring element can be at least one spring element from the group of components subjected to high loads, for example primary conical spring, secondary ancillary spring, axle spring and/or air spring bellows.

The abovementioned problem is moreover solved via a fire-retardant overlayer with the features of independent claim 11. In particular proposed for solution of the problem is a fire-retardant overlayer for a spring element, where the overlayer has at least one compensation zone. This has the advantage that there is no requirement to configure the overlayer with elasticity such that compliance with the mechanical requirements is achieved by virtue of its elasticity. Because the overlayer is not responsible for any springing effect or damping effect, it can be configured to be stiffer than a damping body to which it can be applied.

Advantageous embodiments of the invention are described below which, with the features as claimed in claim 11, can optionally, alone or in combination, be combined together with the features of other embodiments. The advantages that apply in relation to the fire-retardant overlayer are in essence the same as those already described in relation to the features of the spring element.

In a further embodiment of the overlayer it is possible that the compensation zone is configured via an interruption of the overlayer. It is preferably possible that the overlayer has at least two overlayer regions, the arrangement of which is, in the unstressed condition of the overlayer, separate at a distance from one another by virtue of an unoccupied space. In particular, the overlayer can have a number of compensation zones.

Alternatively, or in addition, to the above it is possible in another embodiment that the overlayer is configured to be thinner in the compensation zone than an average layer thickness of the other regions of the overlayer.

In another advantageous embodiment of the fire-retardant overlayer, the overlayer can have been produced to some extent or predominantly from an elastomer, in particular from chloroprene rubber. It is possible here that a test sample represented in the overlayer has a tensile strength of 4.0 MPa, in particular of at least 5.0 MPa, in particular of at least 6.0 MPa, in particular of at least 7.0 MPa, in particular of at least 8.0 Mpa, in particular of at least 9.0 MPa, or above, preferably where tensile strength has been tested by the test method in accordance with the standard ISO 37 and DIN 53504.

It is moreover possible that a test sample representing the overlayer has a modulus of elasticity (100%) of at least 1.0 MPa, in particular of at least 1.2 MPa, in particular of at least 1.4 MPa, or above, and/or that the overlayer has a modulus of elasticity (200%) of at least 1.6 MPa, of at least 1.8 MPa, in particular of at least 2.0 MPa, or above, and/or that the overlayer has a modulus of elasticity (300%) of at least 2.0 MPa, of at least 2.2 MPa, in particular of at least 2.4 MPa, in particular of at least 2.6, or above.

It is moreover possible that the overlayer has an ozone cracking value in class 0, in particular where the ozone cracking value has been determined in accordance with the test standard DIN ISO 1431-1.

It is moreover possible that a maximal value of an average rate of heat emission (MAHRE value) of a test sample corresponding to the overlayer is maximally 90 $kWm^{-2}$, in particular maximally 75 kWm$^{-2}$, in particular maximally 50 kWm$^{-2}$, in particular maximally 40 kWm$^{-2}$, in particular maximally 30 kWm$^{-2}$, in particular maximally 25 kWm$^{-2}$, in particular maximally 20 kWm$^{-2}$, or below, preferably where the MAHRE value has been determined in accordance with the test specification EN ISO 5660-1 with a radiation intensity of 25 kW/m$^2$.

It is moreover possible that a test sample representing the overlayer has a hazard level (CITG value) of maximally 1.8, in particular of maximally 1.5, in particular of maximally 1.2, in particular of maximally 1.0, or below, and/or that a smoke density is maximally 600, in particular maximally 300, in particular maximally 200, in particular maximally 100, or below, preferably where the hazard level (CITG value) and/or the smoke density (Ds, max) has/have been determined by the test method EN ISO 5659-2 with a radiation intensity of 25 kW/m$^2$.

In another advantageous embodiment it is possible that the overlayer comprises at least one flame retardant and/or acid-scavenger, in particular where the at least one flame retardant and/or acid-scavenger is a, or a combination of two or more than two, flame retardant(s) and/or acid-scavenger(s) selected from the group of phosphorus-containing compounds, in particular ammonium polyphosphate (APP), nitrogen-containing compounds, in particular melamine, polyol compounds, in particular pentaerythritol, phosphate-containing plasticizers, in particular Disflamoll DPO, inorganic flame retardants and/or inorganic acid-scavengers from the group of the borates, in particular zinc borate, the group of the hydroxides, in particular aluminum trihydroxide and/or magnesium hydroxide and/or boehmite, the group of the antimony compounds, in particular antimony trioxide and/or antimony pentoxide, the group of the oxides, in particular magnesium oxide, the group of the nanoclays, graphite, in particular expandable graphite.

It is by way of example possible here that a proportion by mass of the at least one flame retardant and/or acid-scavenger, based on the composition of the overlayer, is 30% to 70%, that a proportion by mass of the chloroprene rubber is 30% to 70%, and that a proportion by mass of at least one additional component is 0% to 15%, where the entirety of all components provides at least 60% and at most 100%. The overlayer can preferably have a crosslinking agent as at least one additional component.

The abovementioned problem can moreover be solved via a use, for vibration-damping and/or springing of rail vehicles, of a spring element of the type described and claimed herein. This can preferably be at least one spring element from the group of components subjected to high loads, for example primary conical spring, secondary ancillary spring, axle spring and/or air spring bellows. As already described in the introduction, the rail vehicle sector specifically requires use of components which withstand high mechanical loads and at the same time have a required behavior in the event of a fire. The spring element described and claimed herein is therefore particularly suitable for use in the rail vehicle sector.

The abovementioned problem can moreover be solved via a use, for coating of a spring element for vibration-damping and/or springing of rail vehicles, of a fire-retardant overlayer of the type described and claimed herein. Said spring element can preferably be at least one spring element from the group of components subjected to high loads, for example primary conical spring, secondary ancillary spring, axle spring and/or air spring bellows.

The invention will now be described in more detail with reference to a number of implementation examples, but is not restricted to said implementation examples. Further implementation examples are obtained by combining the features of individual claims, or of a number of claims, with one another and/or with individual features of, or with a number of features of the implementation examples.

DETAILED DESCRIPTION

Figure 1:
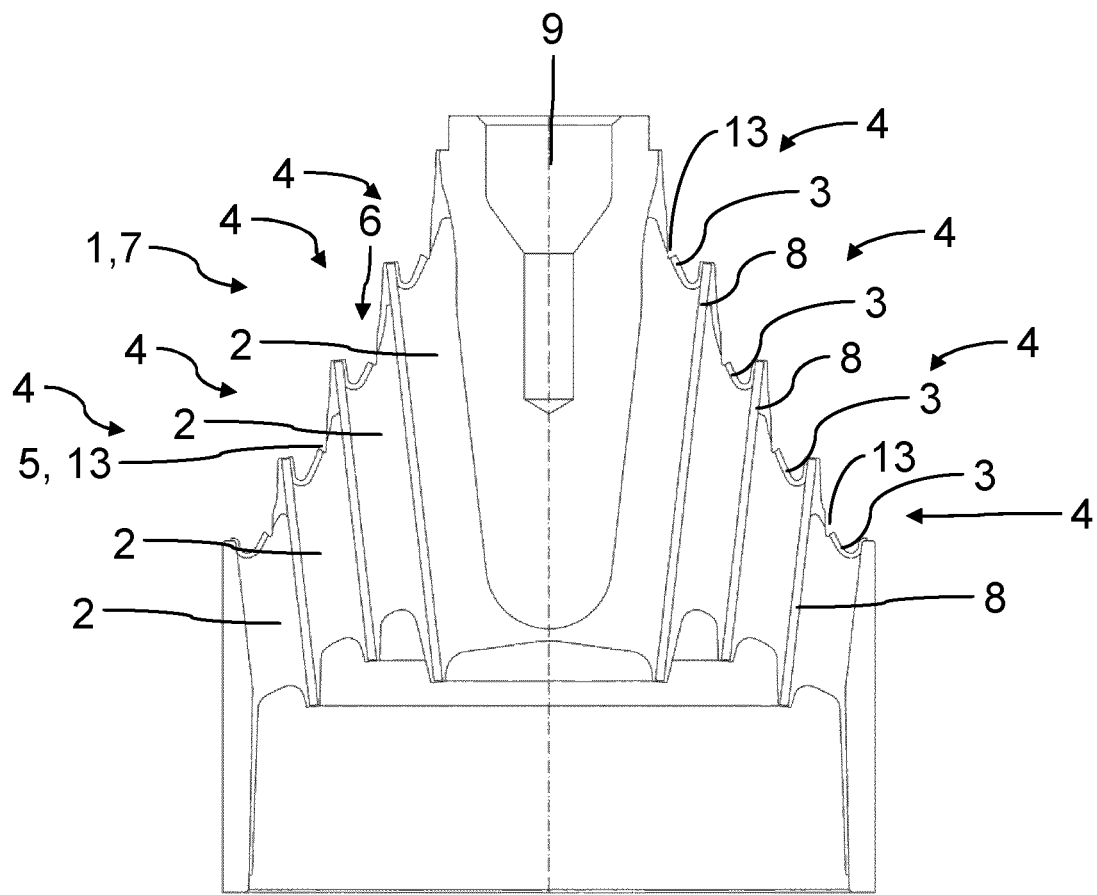
FIG. 1 shows an overall view of a longitudinal section of an implementation variant of a spring element of the invention in the unstressed condition, where the spring element is configured as a conical spring.
Figure 4:
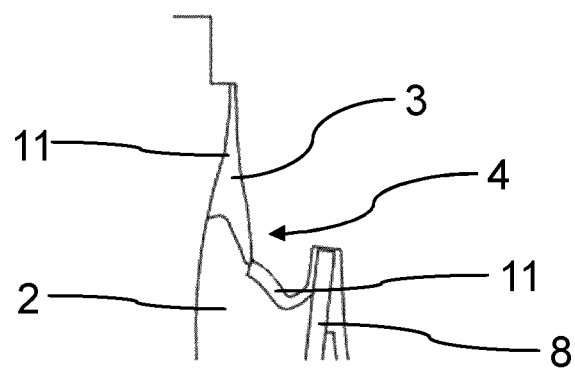
FIG. 4 shows a detail of the compensation zone in an overlayer of the stressed spring element from FIG. 3, where, in the region of the compensation zone, the overlayer regions previously separately by an unoccupied space have been united, and thus a continuous overlayer has been formed.

FIGS. 1 and 4 show a possible design variant of a spring element which in its entirety is indicated by 1. The design variant depicted in the figures is a conical spring 11. The invention can therefore by way of example be realized in components for primary springing in the chassis of a rail vehicle. However, the invention can also be way of example be realized in other components which in particular serve for springing and/or vibration-damping in rail vehicles. The implementation variant depicted is therefore intended only as one possible example, and therefore serves primarily merely for clearer explanation of the invention.

The spring element 1 has a number of elastic damping bodies 2, which respectively bear a fire-retardant overlayer 3.

Suitable materials and compositions for production of damping bodies 2 are already known, and can also be used in combination with the present invention. Known damping bodies 2 are by way of example produced from one or more rubber materials. In particular, there are known damping bodies 2 which are produced at least to some extent from natural rubber but which in the event of a fire do not exhibit behavior that is required for rail vehicles, because they are too readily combustible.

Figure 3:
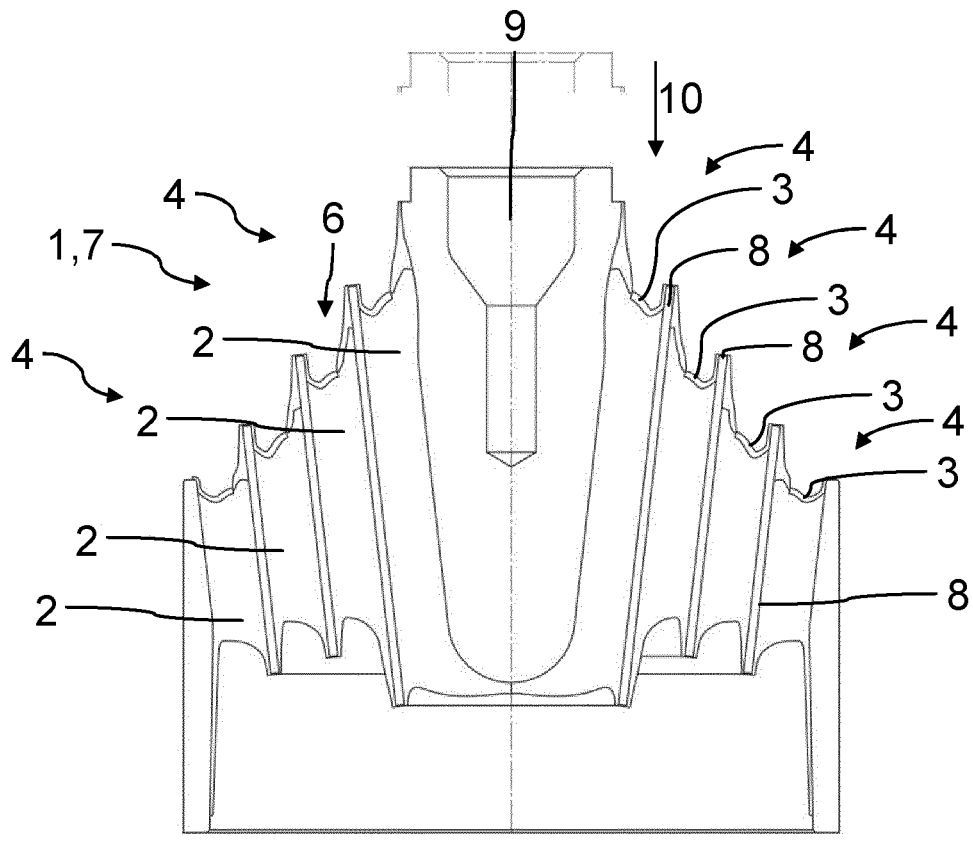
FIG. 3 shows an overall view of a longitudinal section of an implementation variant of a spring element of the invention from FIG. 1, this time in the stressed condition.

As shown in FIGS. 1 and 3, the damping bodies 2 can be arranged concentrically around a longitudinal axis 12 of the spring element 1. Alternatively or in addition to this, the damping bodies can be configured conically, where a cross-sectional diameter of the damping bodies decreases in compression direction 10, in particular decreases continuously.

Each damping body 2 has an overlayer 3 on its external side. There are moreover numerous materials and compositions already known for production of fire-retardant overlayers 3 which can likewise be used in the present invention. The fire-retardant overlayer 3 here can by way of example be stiffer and/or less elastic than the damping body 2. It is possible that a modulus of elasticity of the damping body 2 is lower than a modulus of elasticity of the overlayer 3. The overlayer 3 would therefore wear more rapidly than the damping body 2 during regular mechanical stressing, for example during compression of the spring element 1. The wear of the overlayer 3 would consequently not make it possible to achieve a required lifetime of the spring element 1.

It is possible by way of example that the overlayer 3 has been produced at least to some extent or predominantly from at least one elastomer, in particular from a rubber mixture. A particularly advantageous production material can for example be chloroprene rubber in a composition described above, because the fire-protection properties of said material are suitable for producing a spring element that complies with DIN EN 45545-2.

Figure 2:
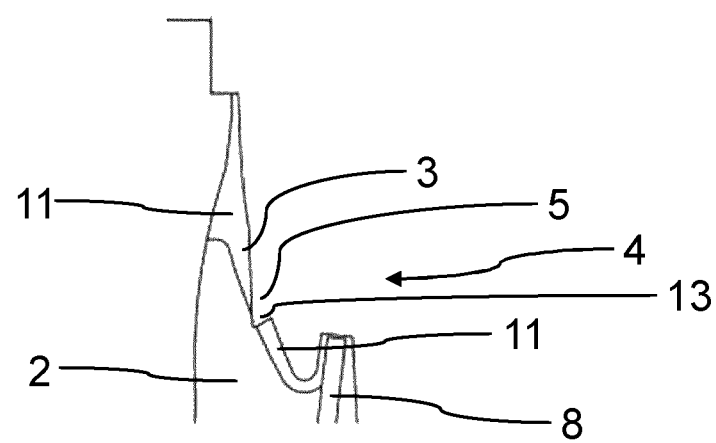
FIG. 2 shows a detail of a compensation zone in an overlayer of the unstressed spring element from FIG. 1, where the overlayer is configured via a cutout in the overlayer.

The overlayers 3 therefore respectively have a compensation zone 4, as can be seen in FIGS. 2 and 4. The compensation zones 4 are designed to prevent folding and/or cracking in the upper layer 3 stresses acting on the overlayer 3 during stressing of the spring element 1.

The compensation zone 4 of the overlayer 3 of the spring element 1 is configured via at least one interruption in the overlayer 3, and thus in the unstressed condition of the spring element 1 and/or in the unstressed condition of the overlayer 3 there is an unoccupied space 5 present between at least two of layer regions 11 of the overlayer 3. Folding in the overlayer 3 as soon as a stressed condition arises can thus be prevented by the compensation zones 4. The interruption can thus result in formation of a groove 13.

Because the overlayers 3 provide external shielding of the damping bodies 2, the overlayers 3 can protect the damping bodies 2 from fire, in particular irrespective of combustibility of the damping bodies 2.

The overlayer 3 and damping body 2 can have been crosslinked to one another to give a composite element 6, thus preventing nondestructive separation of, and/or release of, the overlayer 3 from the damping body 2.

Two neighboring damping bodies 2 can be supported by, and/or separated from one another by, a supported element 8 which by way of example can take the form of a casing. The spring element 1 has a number of supportive elements 8 in particular taking the form of a casing. The supportive elements 8 can have a conical shape, in particular corresponding to the shape of the damping bodies 2. The supportive elements 8 can by way of example be stiff, in particular configured from metal.

The layer thickness of the overlayer 3, in particular its regular layer thickness outside of the composition zone 4, can be 1 mm to 5 mm. This can by way of example be an average layer thickness if the layer thickness cannot be configured to be precisely uniform. In particular, the maximal thickness of the overlayer 3 can be configured to be 4 millimeters, in particular 3 millimeters, in particular 2 millimeters, in particular 1 millimeter.

As can be seen in FIGS. 3 and 4, in the stressed condition of the spring element 1 the overlayer 3 is at least to some extent, preferably completely, continuous. In the stressed condition, an overlayer 3 is formed that is thus preferably externally continuous, because the individual overlayer regions 11 of the overlayer 3 have been united and at least to some extent are in contact with one another.

The spring element 1 can have a receptacle 9 which preferably extends in the longitudinal direction, in particular along the longitudinal axis 12 of the spring element 1 and serves for coupling of the spring element to a further component, for example a bogey.

The at least one unoccupied space 5 can by way of example take the form of a groove 13 or of a plurality of grooves 13 in the overlayer 3. The grooves 13 can by way of example be arranged parallel and/or transverse to one another. The grooves 13 can preferably run transversely, in particular perpendicularly, to a compression direction of the spring element 1. The grooves 13 can by way of example be configured to be distributed across almost the entire surface formed by the overlayer on the spring element 1. There can preferably be a groove 13 configured between each pair of neighboring supportive elements 8. The grooves 13 can therefore be configured between each pair of overlayer regions 11 of the overlayer 3.

The expression "unoccupied space 5" can refer to a material cutout in the overlayer 3.

If the spring element 1 is configured as a conical spring 7, the grooves 13 can be configured concentrically.

An unoccupied space 5, in particular the groove 13 or the grooves, can particularly preferably respectively have a constant, or in essence constant, width. The distance between two overlayer regions, i.e. the unoccupied space 5 of the compensation zone 4, can thus be the same throughout or almost the same throughout. In particular, a maximal difference between a smallest distance and a maximal distance can be 25%, in particular 20%, in particular 15%, in particular 10%, in particular 5%.

Under a minimal load, the unoccupied space 5, in particular the grooves 13, can have been closed in a manner such that at least a continuous layer thickness of 1 mm is present in the united region in the fire-retardant overlayer 3. The layer thickness elsewhere of the overlayer 3 outside the united region can differ from the above, in particular can be greater, for example at least 3 mm, particularly of 4 mm. In the course of further spring-compression, the groove 13 then closes completely and/or the contact width of at least 1 mm width "migrates" within the compressed face side and thus provides continuous fire-protection sheathing.

A distance between two neighboring overlayer regions 11 in the unstressed condition can be at least 0.5 mm, in particular at least 1 mm, in particular at least 2 mm, in particular at least 3 mm, in particular at least 4 mm, in particular at least 5 mm.

The invention therefore in particular provides a spring element 1 for vibration-damping and/or springing of a rail vehicle, with at least one compressible, in particular combustible, damping body 2 and at least one fire-retardant overlayer 3 at least to some extent covering the damping body 2, where the overlayer 3 has at least one compensation zone 4 which has at least two overlayer regions 11 separated from one another, in an unstressed condition of the spring element 1, by an unoccupied space 5, where, in the stressed state of the spring element 1, the overlayer regions 11 are compressed, and they at the edges thereof to some extent or completely come into contact with one another, and thus form an overlayer 3 which completely encloses the damping body 2 and/or in particular which covers said damping body at least on the external side, which overlayer ensures the desired fire-protection.

What is claimed is:

1. A spring element for vibration-damping and/or springing, with at least one elastic damping body and, arranged on the damping body, at least one fire-retardant overlayer, wherein the overlayer has at least one compensation zone, where, in the stressed condition of the spring element, the compensation zone is compressed in a manner such that folding of the overlayer is prevented, and in that the overlayer and the damping body are inseparably crosslinked to give a composite element; and wherein the compensation zone is configured via an interruption of the overlayer;

wherein the overlayer forms, in the installed condition of the spring element, an external layer of the spring element.

2. The spring element of claim 1 wherein the damping body has been produced from at least one rubber material, where an elasticity of the rubber material of the damping body is higher than an elasticity of the overlayer.

3. The spring element of claim 1 wherein the overlayer includes at least one elastomer.

4. The spring element of claim 1 wherein the overlayer includes chloroprene rubber.

5. The spring element of claim 1 wherein the overlayer includes at least one flame retardant and/or acid-scavenger.

6. The spring element as claimed in claim 5, wherein the at least one flame retardant and/or acid-scavenger is one or more flame retardant(s) and/or acid-scavenger(s) selected from the group of phosphorus-containing compounds, nitrogen-containing compounds polyol compounds, phosphate-containing plasticizers, inorganic flame retardants and/or inorganic acid-scavengers.

7. The spring element of claim 1 wherein the overlayer, outside of the compensation zone, has an average layer thickness of 1 millimeter to 5 millimeters.

8. The spring element of claim 1 wherein, in the stressed condition, the at least one compensation zone is to some extent or completely continuous, and there is thus an externally continuous overlayer present.

9. The spring element of claim 1 wherein the spring element is a spring element for vibration-damping and/or springing of rail vehicles.

10. The spring element of claim 1 wherein it is at least one spring element selected from the group of components including a primary conical spring, secondary ancillary spring, axle spring, and/or air spring bellows.

11. The use of a spring element of claim 1 for vibration-damping and/or springing of rail vehicles, preferably where said spring element is at least one spring element from the group of components including a primary conical spring, secondary ancillary spring, axle spring, and/or air spring bellows.

12. The use of a fire-retardant overlayer of claim 1 for coating of a spring element for vibration-damping and/or springing of rail vehicles.

13. The use as claimed in claim 12, wherein said spring element is at least one spring element from the group of components including a primary conical spring, secondary ancillary spring, axle spring, and/or air spring bellows.

14. A fire-retardant overlayer for a spring element, wherein the overlayer has at least one compensation zone, wherein the compensation zone is configured via an interruption of the overlayer;
wherein the overlayer has at least two overlayer regions, the arrangement of which is, in the unstressed condition of the overlayer, separate at a distance from one another by virtue of an unoccupied space.

15. The fire-retardant overlayer of claim 14 wherein the overlayer is configured to be thinner in the compensation zone than an average layer thickness of the other regions of the overlayer.

16. The fire-retardant overlayer of claim 14 wherein the overlayer includes at least one elastomer.

17. The fire-retardant overlayer of claim 14 wherein the overlayer includes chloroprene rubber.

18. The fire-retardant overlayer of claim 14 wherein the overlayer includes at least one flame retardant and/or acid-scavenger.

19. The fire-retardant overlayer of claim 18, wherein the at least one flame retardant and/or acid-scavenger is selected from the group of phosphorus-containing compounds, nitrogen-containing compounds, polyol compounds, phosphate-containing plasticizers, inorganic flame retardants, and/or inorganic acid-scavengers.

* * * * *